United States Patent [19]

Romberger

[11] Patent Number: 4,771,094

[45] Date of Patent: Sep. 13, 1988

[54] COMPOSITIONS FOR SUSPENDING SOLID PARTICLES IN AQUEOUS MEDIA

[75] Inventor: John A. Romberger, Oak Park, Ill.

[73] Assignee: Nalco Chemical Company, Naperville, Ill.

[21] Appl. No.: 57,197

[22] Filed: Jun. 3, 1987

[51] Int. Cl.$^4$ .......................... B01J 13/00; C08J 3/04
[52] U.S. Cl. ................................. 524/310; 252/312; 524/313; 524/322; 524/385; 524/555; 524/556
[58] Field of Search .................. 252/8.511, 8.515, 312; 524/310, 313, 385, 322

[56] References Cited

U.S. PATENT DOCUMENTS

| | | | |
|---|---|---|---|
| Re. 28,474 | 7/1974 | Anderson et al. | 252/363.5 X |
| 2,552,775 | 5/1951 | Fischer et al. | 252/8.511 X |
| 2,718,497 | 9/1955 | Oldham et al. | |
| 2,773,030 | 12/1956 | Tailleur | 252/8.515 X |
| 3,034,983 | 5/1962 | Reddie et al. | 252/8.515 X |
| 3,396,105 | 8/1968 | Burdyn et al. | 252/8.511 |
| 4,374,737 | 2/1983 | Larson et al. | 252/8.515 X |
| 4,392,865 | 7/1983 | Grosse et al. | 252/312 X |
| 4,600,515 | 7/1986 | Gleason et al. | 252/8.511 X |

OTHER PUBLICATIONS

Gray et al., *Composition and Properties of Oil Well Drilling Fluids*, Fourth ed., Pub. 1980, pp. 9-11.

*Primary Examiner*—Herbert B. Guynn
*Attorney, Agent, or Firm*—John G. Premo; Anthony L. Cupoli; Donald G. Epple

[57] ABSTRACT

A stable aqueous slurry of particles which comprises:

| Ingredient | % by weight |
|---|---|
| water | 40-60 |
| oil-in-water emulsion | 10-30 |
| acrylic acid polymer having a MW greater than 1,000,000 | .1-1 |
| suspended particles | 2-50 |

3 Claims, No Drawings

COMPOSITIONS FOR SUSPENDING SOLID PARTICLES IN AQUEOUS MEDIA

INTRODUCTION

Formulations containing solid particles suspended in water are very difficult to stabilize. The solid particles will settle and pack hard making it very difficult to stir them up again. To prevent this problem, one of two approaches is used. In the first approach, a gelling agent is used to increase the viscosity of the water, often to several thousand cps. This slows the speed of particle settling, but it gives the formulation a very different physical aspect, e.g. a very high viscosity. The second approach is to add a hydrophobic material to coat the particles. This reduces the tendency for the particles to stick together. The particles still settle quickly, but they are easy to stir up again. This approach, however, gives little change in formulation properties.

This invention produces stable aqueous suspensions of fine particles using a combination of a water-soluble polymer and an emulsion. This system improves the stability of particles in water without large changes in formulation properties. The polymer type is a high molecular weight, e.g. greater than 1,000,000 molecular weight) polyacrylate or copolymer of acrylic acid and acrylamide. The emulsion is a low internal phase oil-in-water emulsion. The viscosity of the solution goes up only a few hundred cps, but the particles settle very slowly and do not pack hard.

THE INVENTION

The invention comprises a stable aqueous slurry of particles which comprises:

| Ingredient | General % by weight | Preferred % by weight |
| --- | --- | --- |
| water | 40–60 | 50–60 |
| oil-in-water emulsion | 10–30 | 15–25 |
| acrylic acid polymer having a MW greater than 1,000,000 | .1–1 | .1–.5 |
| suspended particles | 2–50 | 15–35 |

THE OIL-IN-WATER EMULSION

The emulsion is composed of the following general ingredients:

| Ingredient | General % by weight | Preferred % by weight |
| --- | --- | --- |
| oil-in-water emulsifier | .1–3 | .2–1 |
| oil phase | 1–20 | 1–5 |
| $H_2O$ | Balance | Balance |

The oil-in-water emulsifier should have an HLB of at least 8 and preferably between 8–18. For a more complete description of the HLB system of classifying emulsifiers, see *Surfactants and Interfacial Phenomena*, M. J. Rosen, John Wiley & Sons, Inc., 1978, Kirk-Othmer's *Encyclopedia of Chemical Technology*, Third Edition, Vol. 8, pg. 899–930, John Wiley & Sons, Inc., 1979, McCutcheon's 1978 *Annual Detergents & Emulsifiers*, North American Edition, MC Publishing Company, 1978, and the references and emulsifiers described in these three works.

The oil phase of the emulsion should be composed of a hydrophobic liquid or solid which contains one or more of the polar groups, hydroxyl, carboxylic acid or carboxylic ester. Typical of such material are such compounds as glyceryl monostearate, cetyl alcohol, animal fats and vegetable oils, certain natural esters such as lanolin and the like.

THE WATER-SOLUBLE ACRYLIC ACID POLYMERS

The term acrylic acid polymers described herein and in the claims includes acrylic acid homopolymers and other polymers of acrylic acid which contain at least 5% by weight of acrylic acid with another copolymer such as acrylamide. It is preferred that the polymers contain at least 10% and preferably at least 20% by weight of acrylic acid, preferably in the form of its water-soluble salt, e.g. sodium or ammonium. The weight average molecular weight of these polymers should be at least 1,000,000 and is preferably 5,000,000–10,000,000 or greater. A convenient form and method of using these polymers is described in U.S. Pat. No. Re. 28,474, the disclosure of which is incorporated herein by reference.

THE SUSPENDED PARTICLES

The particles would, of course, be selected from any group of hydrophilic particles sought to be suspended. Generally they are inorganic particles which have an average particle size not greater than 20 microns and preferably not greater than 15 microns. The invention is particularly useful in suspending finely divided alumina particles.

COMPOSITION

A typical composition of the invention is Composition A listed below:

| Composition A | |
| --- | --- |
| Components | Wt. % |
| water | 54.75 |
| emulsion | 20.00 |
| Alumina | 25.00 |
| acrylic acid polymer[1] | .25 |

[1] The acrylic acid polymer contained 30% by weight of acrylic acid with the balance being acrylamide. It had a weight average molecular weight of about 12,000,000.

In the above composition, the emulsion had the following composition:

| Ingredient | % by weight |
| --- | --- |
| water | 96.5 |
| glyceryl monostearate | 2.1 |
| cetyl alcohol | .9 |
| Sorbitan monostearate Rx 20 moles of EO[2] | .43 |
| Sorbitan monostearate acrylic acid polymer[2] | .07 |

[2] The blend of oil and water emulsifier had a HLB of 15.5.

EVALUATION OF THE INVENTION

To prove the effectiveness of this combination, it was compared to its component parts. The following table shows the formulations used in this study:

| | Wt. % | | |
| --- | --- | --- | --- |
| Components | A | B | C |
| water | 54.75 | 74.75 | 55.00 |

-continued

| Components | Wt. % | | |
|---|---|---|---|
| | A | B | C |
| emulsion | 20.00 | 0.00 | 20.00 |
| Alumina | 25.00 | 25.00 | 25.00 |
| acrylic acid polymer | .25 | .25 | 0.00 |

Formula A is the combination of a polymer and an emulsion to suspend solid particles, 12 micron alumina in water. Formula B is the use of the polymer only: this represents the approach of increasing the viscosity, although in this case the increase is only a few hundred cps. Formula C, however, is the use of the emulsion only; this is similar to the use of hydrophobic materials to coat the particles.

In the first experiment, these formulations were tested for settling. Five samples of each formula were put into centrifuge tubes. Each tube had 45 mL of formulation. As the samples settled, a layer of clear water developed on the top of the sample—the greater the settling, the larger the volume of this clear layer. At the end of one month, the volume of the clear layer was measured:

| Sample | mL Clear | | |
|---|---|---|---|
| | A | B | C |
| 1 | 1.0 | 38.0 | 14.0 |
| 2 | 1.0 | 37.5 | 14.0 |
| 3 | 1.0 | 37.5 | 13.0 |
| 4 | 1.0 | 37.5 | 12.0 |
| 5 | 2.0 | 37.5 | 12.0 |
| Average | 1.2 | 37.6 | 13.0 |

Formula A shows less settling than the other two formulas.

An analysis of variance of this experiment is shown below:

| Source | Sum of Squares | df | Mean Sq. |
|---|---|---|---|
| All | 7926.00 | 15 | |
| Grand Ave. | 4472.07 | 1 | |
| Residual | 3453.93 | 14 | |
| Treatment | 3448.93 | 2 | 1724.47 |
| Error | 5.00 | 12 | .417 |

F = 4135
F(std.) = 3.89
95% CL +/−.629

Because the F-value for the analysis (4135) is greater than the standard F-value (3.89), the effect of the treatments (the differences in the three formulas) is significant. The 95% confidence limit (CL) shows that the treatment averages are accurate to plus or minus 0.629 mL. This means that each formulation is significantly different from the other two: the invention (formula A) does not setle as much as either of the other two.

The next experiment measured the amount of compacting that occurred. Again, 45 mL of each formula was put into five centrifuge tubes. This time, the tubes were shaken once a week. After one month, the formulation was removed from each tube, and the volume of remaining solid was measured. The greater this volume of packed solid, the more unstable the particles in the formulation. The results of this experiment are as follows:

| Sample | mL Clear | | |
|---|---|---|---|
| | A | B | C |
| 1 | 2.5 | 7.5 | 15.0 |
| 2 | 2.5 | 7.5 | 11.0 |
| 3 | 2.5 | 7.5 | 11.0 |
| 4 | 2.5 | 7.5 | 8.0 |
| 5 | 2.5 | 7.0 | 7.5 |
| Average | 2.5 | 7.4 | 10.5 |

Here again, the invention, formula A, works better than either of the other two formulas—there is less solid packed in the bottom of these tubes.

The analysis of variance for this experiment is shown below:

| Source | Sum of Squares | df | Mean Sq. |
|---|---|---|---|
| All | 892.50 | 15 | |
| Grand Ave. | 693.60 | 1 | |
| Residual | 198.90 | 14 | |
| Treatment | 162.70 | 2 | 18.35 |
| Error | 36.20 | 12 | 3.02 |

F = 26.9
F(std.) = 3.89
95% CL +/−1.69

As before, the experimental F-value is greater than the standard F-value, so the formulas are not the same. The 95% confidence limit shows that each formula is significantly different from the other two. The invention prevents hard packing of solids better than the other two formulas.

In summary, the combination of the polymer and an emulsion gives superior stability to a formulation containing solid particles in water.

Having described my invention, I claim:

1. A stable aqueous slurry of particles which comprises:

| Ingredient | % by Weight |
|---|---|
| water | 40–60 |
| oil-in-water emulsion | 10–30 |
| acrylic acid homopolymer or acrylamide-acrylic acid copolymer having a MW greater than 1,000,000 | .1–1 |
| suspended inorganic particles | 2–50 | wherein the oil-in-water emulsion contains between 1–3% by weight of an oil-in-water emulsifier having an HLB of at least 8 and the oil phase consists of 1–5% by weight of a hydrophobic compound containing at least 1 polar group from the group consisting of alcohols, carboxylic acids and carboxylic esters, the polymer contains at least 20% by weight of acrylic acid and the inorganic particles have an average particle size less then 20 microns.

2. A stable aqueous slurry of particles which comprises:

| Ingredient | % by Weight |
|---|---|
| water | 50–60 |
| oil-in-water emulsion | 15–25 |
| acrylic acid homopolymer or acrylamide-acrylic acid copolymer having a MW greater than 1,000,000 | .1–.5 |

| Ingredient | % by Weight |
|---|---|
| suspended inorganic particles | 15–35 | wherein the oil-in-water emulsion contains between 1–3% by weight of an oil-in-water emulsifier having an HLB of at least 8 and the oil phase consists of 1–5% by weight of a hydrophobic compound containing at least 1 polar group from the group consisting of alcohols, carboxylic acids and carboxylic esters, the polymer contains at least 20% by weight of acrylic acid and the inorganic particles have an average particle size less then 20 microns.

3. The stable aqueous slurry particles of claim 1 where the inorganic particles are alumina.

* * * * *